(12) United States Patent
Shigemoto et al.

(10) Patent No.: US 7,988,797 B2
(45) Date of Patent: Aug. 2, 2011

(54) NANO-COMPOSITE MAGNET, QUENCHED ALLOY FOR NANO-COMPOSITE MAGNET, AND METHOD FOR PRODUCING THEM AND METHOD FOR DISTINGUISHING THEM

(75) Inventors: Yasutaka Shigemoto, Osaka (JP); Satoshi Hirosawa, Shiga (JP); Toshio Miyoshi, Osaka (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 12/781,093

(22) Filed: May 17, 2010

(65) Prior Publication Data

US 2010/0219922 A1    Sep. 2, 2010

Related U.S. Application Data

(62) Division of application No. 10/596,371, filed as application No. PCT/JP2004/018159 on Dec. 6, 2004, now abandoned.

(30) Foreign Application Priority Data

Dec. 10, 2003    (JP) ................. 2003-411533

(51) Int. Cl.
*H01F 1/057* (2006.01)
*H01F 1/058* (2006.01)
(52) U.S. Cl. ......... 148/302; 148/301; 148/101; 148/121
(58) Field of Classification Search .......... None
See application file for complete search history.

(56) References Cited

U.S. PATENT DOCUMENTS

2002/0017339 A1 * 2/2002 Kanekiyo et al. ............ 148/302
2002/0117235 A1 * 8/2002 Kanekiyo et al. ............ 148/101

OTHER PUBLICATIONS

Shigemoto et al.; "Nano-composite magnet, quenched alloy for nano-composite magnet, and method for producing them and method for distinguishing them"; U.S. Appl. No. 10/596,371, filed Jun. 9, 2006.

* cited by examiner

*Primary Examiner* — John P Sheehan
(74) *Attorney, Agent, or Firm* — Keating & Bennett, LLP (57) ABSTRACT

A nanocomposite magnet according to the present invention has a composition represented by the general formula: $R_xQ_yM_z(Fe_{1-m}T_m)_{bal}$, where R is at least one rare-earth element, Q is at least one element selected from the group consisting of B and C, M is at least one metal element that is selected from the group consisting of Al, Si, Ti, V, Cr, Mn, Cu, Zn, Ga, Zr, Nb, Mo, Ag, Hf, Ta, W, Pt, Au and Pb and that always includes Ti, and T is at least one element selected from the group consisting of Co and Ni. The mole fractions x, y, z and m satisfy the inequalities of 6 at %$\leq$x<10 at %, 10 at %$\leq$y$\leq$17 at %, 0.5 at %$\leq$z$\leq$6 at % and 0$\leq$m$\leq$0.5, respectively. The nanocomposite magnet includes a hard magnetic phase and a soft magnetic phase that are magnetically coupled together. The hard magnetic phase is made of an $R_2Fe_{14}B$-type compound, and the soft magnetic phase includes an $\alpha$-Fe phase and a crystalline phase with a Curie temperature of 610° C. to 700° C. ($\omega$ phase) as its main phases.

4 Claims, 10 Drawing Sheets

DUE TO HEAT GENERATED BY CRYSTALLIZATION, NOT ω PHASE

DUE TO HEAT GENERATED
BY CRYSTALLIZATION, NOT ω PHASE

NANO-COMPOSITE MAGNET, QUENCHED ALLOY FOR NANO-COMPOSITE MAGNET, AND METHOD FOR PRODUCING THEM AND METHOD FOR DISTINGUISHING THEM

TECHNICAL FIELD

The present invention relates to a nanocomposite magnet including hard magnetic phases and soft magnetic phases that have very small sizes and that are magnetically coupled together.

BACKGROUND ART

Recently, it has become more and more necessary to further enhance the performance of, and further reduce the size and weight of, consumer electronic appliances, office automation appliances and various other types of electric equipment. For these purposes, a permanent magnet for use in each of these appliances is required to maximize its performance to weight ratio when operated as a magnetic circuit. For example, a permanent magnet with a remanence $B_r$ of 0.5 T (tesla) or more is now in high demand. Hard ferrite magnets have been used widely because magnets of this type are relatively inexpensive. However, the hard ferrite magnets cannot have that high remanence $B_r$ of 0.5 T or more.

An Sm—Co based magnet, produced by a powder metallurgical process, is currently known as a typical permanent magnet with that high remanence $B_r$ of 0.5 T or more. Examples of other high-$B_r$ magnets include an Nd—Fe—B based sintered magnet produced by a powder metallurgical process and an Nd—Fe—B based quenched magnet produced by a melt quenching process. An Nd—Fe—B based sintered magnet of the former type is disclosed in Patent Document No. 1, for example, and an Nd—Fe—B based quenched magnet of the latter type is disclosed in Patent Document No. 2, for instance.

However, the Sm—Co based magnet is expensive, because its materials Sm and Co are both expensive.

As for the Nd—Fe—B based magnet on the other hand, the magnet is mainly composed of relatively inexpensive Fe (typically accounting for about 60 wt % to about 70 wt % of the overall magnet), and is much less expensive than the Sm—Co based magnet. Nevertheless, it is still expensive to produce the Nd—Fe—B based magnet. This is partly because huge equipment and a great number of process steps are needed to separate and purify, or to obtain by reduction reaction, Nd, which usually accounts for about 10 at % to about 15 at % of the magnet. Also, a powder metallurgical process normally requires a relatively large number of process steps by its nature.

In contrast, the Nd—Fe—B based quenched magnet produced by a melt quenching process can be obtained through relatively simple process steps of melting, melt quenching and heat-treating. Thus, compared to an Nd—Fe—B based magnet formed by a powder metallurgical process, an Nd—Fe—B based quenched magnet can be produced at a lower process cost. However, to obtain a permanent magnet in bulk by a melt quenching process, a bonded magnet should be formed by compounding a magnet powder, made from a rapidly solidified alloy, with a resin binder. Accordingly, the magnet powder normally accounts for at most about 80 volume % of the molded bonded magnet. Also, a rapidly solidified alloy, formed by a melt quenching process, is magnetically isotropic.

For these reasons, an Nd—Fe—B based quenched magnet produced by a melt quenching process has a lower $B_r$ than an anisotropic Nd—Fe—B based sintered magnet produced by a powder metallurgical process.

As disclosed in Patent Document No. 3, a technique of adding at least one element selected from the group consisting of Zr, Nb, Mo, Hf, Ta and W and at least one more element selected from the group consisting of Ti, V and Cr in combination effectively improves the properties of an Nd—Fe—B based quenched magnet. When these elements are added, the magnet can have its coercivity $H_{cJ}$ and anticorrosiveness increased. However, the only known effective technique of improving the remanence $B_r$ is increasing the density of a bonded magnet. Also, if the Nd—Fe—B based quenched magnet includes at least 6 at % of rare-earth element, a melt spinning process, in which a melt is ejected through a nozzle against a chill roller, has often been used in the prior art to quench the melt at an increased rate.

As for an Nd—Fe—B based quenched magnet, an alternative magnet material was proposed in Non-Patent Document No. 1. The magnet material has a composition including a rare-earth element at a relatively low mole fraction (i.e., around $Nd_{3.8}Fe_{77.2}B_{19}$, where the subscripts are indicated in atomic percentages); and an $Fe_3B$ type compound phase as its main phase. This permanent magnet material is obtained by heating and crystallizing an amorphous alloy that has been prepared by a melt quenching process. Also, the crystallized material has a metastable structure in which soft magnetic $Fe_3B$ and hard magnetic $Nd_2Fe_{14}B$ phases coexist and in which crystal grains of very small sizes are distributed finely and uniformly as a composite of these two crystalline phases. Therefore, a magnet made from such a material is called a "nanocomposite magnet". It was reported that such a nanocomposite magnet has a remanence $B_r$ as high as 1 T or more. But the coercivity $H_{cJ}$ thereof is relatively low, i.e., in the range of 160 kA/m to 240 kA/m. Accordingly, this permanent magnet material is applicable only when the operating point of the magnet is 1 or more.

It has been proposed that various metal elements be added to the material alloy of a nanocomposite magnet to improve the magnetic properties thereof. See Patent Documents Nos. 4, 5, 6 and 7, for example. However, none of these proposed techniques are reliable enough to always realize a sufficient "characteristic value per cost". More specifically, none of the nanocomposite magnets produced by these techniques realizes a coercivity that is high enough to actually use it in various applications. Thus, none of these magnets can exhibit reasonably good magnetic properties in practice.

Also, a technique of obtaining $Nd_2Fe_{14}B$ and α-Fe phases with grain sizes on the order of several tens nm was reported. According to this technique, an amorphous former La is added to a material alloy. Next, the melt of the material alloy is quenched to obtain a rapidly solidified alloy mainly composed of amorphous phases. And then the alloy is heated and crystallized to nucleate and grow both the $Nd_2Fe_{14}B$ and α-Fe phases simultaneously. See Non-Patent Document No. 2. This article also teaches that adding a refractory metal element such as Ti in a very small amount (e.g., 2 at %) improves the magnet performance and that the mole fraction of Nd, rare-earth element, is preferably increased from 9.5 at % to 11.0 at % to reduce the grain sizes of the $Nd_2Fe_{14}B$ and α-Fe phases. The refractory metal is added to reduce the nucleation of borides such as $R_2Fe_{23}B_3$ and $Fe_3B$ and to make a magnet consisting essentially of $Nd_2Fe_{14}B$ and α-Fe phases only. According to this technique, the rapidly solidified alloy to make a nanocomposite magnet is prepared by a melt spinning process in which a molten alloy is ejected through a nozzle onto the surface of a chill roller that is rotating at a high velocity. The melt spinning process can be used effectively to make an amorphous rapidly solidified alloy because a process of this type ensures an extremely high quenching rate.

In order to overcome these problems, the applicant of the present application developed a nanocomposite magnet, in which Ti is added to a composition range, including less than 10 at % of rare-earth element and more than 10 at % of boron, such that the nucleation of α-Fe is reduced during the melt-quenching process and that the volume percentage of a compound with an $R_2Fe_{14}B$-type crystal structure is increased, and disclosed in Patent Document No. 8.

Furthermore, Patent Documents Nos. 9 and 10 cite a number of elements, including Al, Si, V, Cr, Mn, Ga, Zr, Mb, Mo, Ag, Hf, Ta, W, Pt, Au and Pb, which can be added to a nanocomposite magnet.

Patent Document No. 1: Japanese Patent Application Laid-Open Publication No. 59-46008
Patent Document No. 2: Japanese Patent Application Laid-Open Publication No. 60-9852
Patent Document No. 3: Japanese Patent Application Laid-Open Publication No. 1-7502
Patent Document No. 4: Japanese Patent Application Laid-Open Publication No. 3-261104
Patent Document No. 5: Japanese Patent No. 2727505
Patent Document No. 6: Japanese Patent No. 2727506
Patent Document No. 7: PCT International Publication No. WO 00/03403
Patent Document No. 8: Japanese Patent Application Laid-Open Publication No. 2002-175908
Patent Document No. 9: Japanese Patent Application Laid-Open Publication No. 2002-285301
Patent Document No. 10: Japanese Patent No. 3297676
Non-Patent Document No. 1: R. Coehoorn et al., J. de Phys, C8, 1988, pp. 669-670
Non-Patent Document No. 2: W. C. Chan et. al., "The Effects of Refractory Metals on the Magnetic Properties of α-Fe/$R_2Fe_{14}B$-type Nanocomposites", IEEE Trans. Magn. No. 5, INTERMAG. 99, Kyongiu, Korea, pp. 3265-3267, 1999.

DISCLOSURE OF INVENTION

Problems to be Solved by the Invention

According to the conventional techniques of producing a nanocomposite magnet, by adding Ti, the nucleation and excessive grain growth of α-Fe during the melt-quenching process can be reduced so much that the magnet performance improves significantly. However, if the cooling procedure changed in the melt-quenching process, then the properties of the resultant nanocomposite magnet would change. In that case, it would be still difficult to provide nanocomposite magnets with excellent magnetic properties constantly on a mass-productive basis.

In order to overcome the problems described above, a primary object of the present invention is to provide a nanocomposite magnet that exhibits excellent magnetic properties constantly.

Means to Solve the Problems

A nanocomposite magnet according to the present invention has a composition represented by the general formula: $R_xQ_yM_z(Fe_{1-m}T_m)_{bal}$, where R is at least one rare-earth element, Q is at least one element selected from the group consisting of B and C, M is at least one metal element that is selected from the group consisting of Al, Si, Ti, V, Cr, Mn, Cu, Zn, Ga, Zr, Nb, Mo, Ag, Hf, Ta, W, Pt, Au and Pb and that always includes Ti, and T is at least one element selected from the group consisting of Co and Ni. The mole fractions x, y, z and m satisfy the inequalities of 6 at %≦x<10 at %, 10 at %≦y≦17at %, 0.5 at %≦z≦6 at % and 0≦m≦0.5, respectively. The nanocomposite magnet includes a hard magnetic phase and a soft magnetic phase that are magnetically coupled together. The hard magnetic phase is made of an $R_2Fe_{14}B$-type compound, and the soft magnetic phase includes an α-Fe phase and a crystalline phase with a Curie temperature of 610° C. to 700° C. as its main phases.

In one preferred embodiment, 6 at %≦x≦8 at %, and the crystalline phase included in the soft magnetic phase has a Curie temperature of 610° C. to 650° C.

In another preferred embodiment, Ti accounts for 0.25 at % to 6 at % of the overall magnet.

In still another preferred embodiment, the content of the crystalline phase included in the soft magnetic phase is greater than that of an $Fe_3B$-type compound phase.

In yet another preferred embodiment, the $R_2Fe_{14}B$-type compound phase has an average grain size of 10 nm to 70 nm, and a soft magnetic phase with an average grain size of 1 nm to 10 nm is present on the grain boundary of the $R_2Fe_{14}B$-type compound phase.

A rapidly solidified alloy according to the present invention is used to make a nanocomposite magnet and has a composition represented by the formula: $R_xQ_yM_z(Fe_{1-m}T_m)_{bal}$, where R is at least one rare-earth element, Q is at least one element selected from the group consisting of B and C, M is at least one metal element that is selected from the group consisting of Al, Si, Ti, V, Cr, Mn, Cu, Zn, Ga, Zr, Nb, Mo, Ag, Hf, Ta, W, Pt, Au and Pb and that always includes Ti, and T is at least one element selected from the group consisting of Co and Ni. The mole fractions x, y, z and m satisfy the inequalities of 6 at %≦x≦10 at %, 10 at %≦y≦17 at %, 0.5 at %≦z≦6 at % and 0≦m≦0.5, respectively. The alloy includes an $R_2Fe_{14}B$-type compound, an α-Fe phase, and a crystalline phase with a Curie temperature of 610° C. to 700° C.

In one preferred embodiment, 6 at %≦x≦8 at %, and the crystalline phase included in a soft magnetic phase has a Curie temperature of 610° C. to 650° C.

A method of making a rapidly solidified alloy as a material for a nanocomposite magnet according to the present invention includes the steps of: preparing a molten alloy having a composition represented by the general formula: $R_xQ_yM_z(Fe_{1-m}T_m)_{bal}$, where R is at least one rare-earth element, is at least one element selected from the group consisting of B and C, M is at least one metal element that is selected from the group consisting of Al, Si, Ti, V, Cr, Mn, Cu, Zn, Ga, Zr, Nb, Mo, Ag, Hf, Ta, W, Pt, Au and Pb and that always includes Ti, T is at least one element selected from the group consisting of Co and Ni, and the mole fractions x, y, z and m satisfy the inequalities of 6 at %≦x≦8 at %, 10 at %≦y≦17 at %, 0.5 at %≦z≦6 at % and 0≦m≦0.5, respectively, and quenching the molten alloy by bringing the molten alloy into contact with the surface of a rotating chill roller, thereby forming a rapidly solidified alloy. The step of quenching includes adjusting a quenching rate within the range of $2.2 \times 10^5$ K/s to $2.8 \times 10^5$ K/s when the surface temperature of the alloy decreases from 900° C. to 700° C.

Another method of making a rapidly solidified alloy as a material for a nanocomposite magnet according to the present invention includes the steps of: preparing a molten alloy having a composition represented by the general formula: $R_xQ_yM_z(Fe_{1-m}T_m)_{bal}$, where R is at least one rare-earth element, Q is at least one element selected from the group consisting of B and C, M is at least one metal element that is selected from the group consisting of Al, Si, Ti, V, Cr, Mn, Cu, Zn, Ga, Zr, Nb, Mo, Ag, Hf, Ta, W, Pt, Au and Pb and that always includes Ti, T is at least one element selected from the group consisting of Co and Ni, and the mole fractions x, y, z and m satisfy the inequalities of 8 at %<x<10 at %, 10 at %≦y≦17 at %, 0.5 at %≦z≦6 at % and 0≦m≦0.5, respectively, and quenching the molten alloy by bringing the molten alloy into contact with the surface of a rotating chill roller, thereby forming a rapidly solidified alloy. The step of quenching includes adjusting a quenching rate within the range of $2.2 \times 10^5$ K/s to $4.5 \times 10^5$ K/s when the surface temperature of the alloy decreases from 900° C. to 700° C.

In one preferred embodiment, the step of quenching includes adjusting a quenching rate at $4.0 \times 10^5$ K/s or more when the surface temperature of the alloy decreases from 1,300° C. to 900° C.

In another preferred embodiment, the step of quenching includes making a crystalline phase, included in the rapidly solidified alloy, account for more than 50 vol % of the entire rapidly solidified alloy.

A method for producing a nanocomposite magnet according to the present invention includes the steps of making a rapidly solidified alloy by one of the methods described above, and thermally treating the rapidly solidified alloy, thereby forming a nanocomposite structure in which hard magnetic phases of an $R_2Fe_{14}B$-type compound and soft magnetic phases, consisting essentially of an α-Fe phase and a crystalline phase with a Curie temperature of 610° C. to 650° C., are magnetically coupled together.

A decision method for a nanocomposite magnet according to the present invention includes the steps of: preparing multiple rapidly solidified alloys as materials for a nanocomposite magnet, each said alloy having a composition represented by the formula: $R_xQ_yM_z(Fe_{1-m}T_m)_{bal}$, where R is at least one rare-earth element, Q is at least one element selected from the group consisting of B and C, M is at least one metal element that is selected from the group consisting of Al, Si, Ti, V, Cr, Mn, Cu, Zn, Ga, Zr, Nb, Mo, Ag, Hf, Ta, W. Pt, Au and Pb and that always includes Ti, T is at least one element selected from the group consisting of Co and Ni, and the mole fractions x, y, z and m satisfy the inequalities of 6 at %≦x<10 at %, 10 at %≦y≦17 at %, 0.5 at %≦z≦6 at % and 0≦m≦0.5, respectively, and determining whether or not a rapidly solidified alloy to make a nanocomposite magnet, which has been selected from the multiple rapidly solidified alloys, includes a soft magnetic phase having a Curie temperature of 610° C. to 700° C.

In one preferred embodiment, 6 at %≦x≦8 at %, and the crystalline phase included in the soft magnetic phase has a Curie temperature of 610° C. to 650° C.

In another preferred embodiment, the step of determining includes subjecting the rapidly solidified alloy to make a nanocomposite magnet to thermogravimetry.

Another nanocomposite magnet according to the present invention has a composition represented by the general formula: $R_xQ_yM_z(Fe_{1-m}T_m)_{bal}$, where R is at least one rare-earth element, Q is at least one element selected from the group consisting of B and C, M is at least one metal element that is selected from the group consisting of Al, Si, Ti, V, Cr, Mn, Cu, Zn, Ga, Zr, Nb, Mo, Ag, Hf, Ta, W, Pt, Au and Pb and that always includes Ti, and T is at least one element selected from the group consisting of Co and Ni. The mole fractions x, y, z and m satisfy the inequalities of 6 at %≦x<10 at %, 10 at %≦y≦17 at %, 0.5 at %≦z≦6 at % and 0≦m≦0.5, respectively. The nanocomposite magnet includes a hard magnetic phase and a soft magnetic phase that are magnetically coupled together. The hard magnetic phase is made of an $R_2Fe_{14}B$-type compound, and the soft magnetic phase includes an α-Fe phase and an $Fe_2B$ phase as its main phases.

In one preferred embodiment, 6 at %≦x≦8 at %.

Another rapidly solidified alloy according to the present invention is also used to make a nanocomposite magnet and has a composition represented by the general formula: $R_xQ_yM_z(Fe_{1-m}T_m)_{bal}$, where R is at least one rare-earth element, Q is at least one element selected from the group consisting of B and C, M is at least one metal element that is selected from the group consisting of Al, Si, Ti, V, Cr, Mn, Cu, Zn, Ga, Zr, Nb, Mo, Ag, Hf, Ta, W, Pt, Au and Pb and that always includes Ti, and T is at least one element selected from the group consisting of Co and Ni. The mole fractions x, y, z and m satisfy the inequalities of 6 at %≦x<10 at %, 10 at %≦y≦17 at %, 0.5 at %≦z≦6 at % and 0≦m≦0.5, respectively. The rapidly solidified alloy includes an $R_2Fe_{14}B$-type compound, an α-Fe phase and an $Fe_2B$ phase.

In one preferred embodiment, 6 at %≦x≦8 at %.

EFFECT OF INVENTION

According to the present invention, nanocomposite magnets, of which the properties are close to those predicted theoretically, can be mass-produced at a good yield.

DESCRIPTION OF REFERENCE NUMERALS 1b, 2b, 8b and 9b atmospheric gas inlet port
1a, 2a, 8a and 9a gas outlet port
1 melting chamber
2 quenching chamber
3 melt crucible
4 reservoir
5 teeming nozzle
6 funnel
7 rotating chill roller
21 melt
22 alloy thin strip

BEST MODE FOR CARRYING OUT THE INVENTION

In an $R_2Fe_{14}B/Fe_3B$ based nanocomposite magnet including less than 10 at % of rare-earth element R such as Nd and 10 at % or more of B (boron), if Ti is added to its material alloy, the nucleation and growth of α-Fe can be controlled and the volume percentage of an $R_2Fe_{14}B$-type compound can be increased in the rapidly solidified alloy to be made by quenching a molten alloy. Amorphous phases, included in such a rapidly solidified alloy in which the $R_2Fe_{14}B$-type compound has been nucleated and grown preferentially during the rapid cooling process, will be crystallized during a heat treatment process to be carried out subsequently. Consequently, a fine metal structure, in which iron-based borides of very small sizes are distributed on the grain boundary of the $R_2Fe_{14}B$-type compound, is realized.

Those very small iron-based borides on the grain boundary are magnetically coupled to the $R_2Fe_{14}B$-type compound via exchange interactions and play an important role in exhibiting excellent properties as a nanocomposite magnet. That is to say, the properties of a nanocomposite magnet are changeable with not only the size of the $R_2Fe_{14}B$-type compound phase but also with the magnetic properties and sizes of the iron-based boride on the grain boundary.

Meanwhile, the nanocrystalline structure of the resultant nanocomposite magnet depends heavily on the fine structure of the rapidly solidified alloy yet to be thermally treated, which in turn changes significantly according to the conditions of quenching the molten alloy. That is why to mass-produce nanocomposite magnets with excellent magnet performance, the correlation between the melt-quenching conditions and the fine structure of the rapidly solidified alloy should be elucidated, which has not yet been done successfully so far.

The present inventors discovered that by defining the composition of the material alloy within a particular range and optimizing the melt-quenching conditions, a novel nanocomposite magnet structure, which had been known to nobody in the art, could be obtained, thus acquiring the basic idea of the present invention.

Hereinafter, a method for producing a nanocomposite magnet according to the present invention will be described.

First, a molten alloy having a composition represented by the general formula: $R_xQ_yM_z(Fe_{1-m}T_m)_{bal}$ is prepared. In this formula, R is at least one rare-earth element, Q is at least one element selected from the group consisting of B and C, M is at least one metal element that is selected from the group consisting of Al, Si, Ti, V, Cr, Mn, Cu, Zn, Ga, Zr, Nb, Mo, Ag, Hf, Ta, W, Pt, Au and Pb and that always includes Ti, T is at least one element selected from the group consisting of Co and Ni, and the mole fractions x, y, z and m satisfy the inequalities of 6 at %≦x<10 at %, 10 at %≦y≦17 at %, 0.5 at %≦z≦6 at % and respectively.

The rare-earth element R preferably includes substantially no La or Ce, because if La or Ce were included in the rare-earth elements R, the coercivity and the loop squareness would both decrease. However, the magnetic properties will not be affected so seriously if a very small percentage (i.e., 0.5 at % or less) of La or Ce is included as an inevitably contained impurity. More specifically, R preferably includes Pr or Nd as an indispensable element, a portion of which may be replaced with Dy and/or Tb. If the mole fraction x of R were less than 6 at % of the overall magnet, then the compound phase with the $R_2Fe_{34}B$ type crystal structure, which is needed for realizing the coercivity, would not crystallize sufficiently and the coercivity $H_{cJ}$ would decrease significantly. That is why the lower limit of the mole fraction x of the rare-earth element R is set to 6 at %. On the other hand, the upper limit of the mole fraction x of R is set to 10 at % and the mole fraction y of Q, consisting of B and/or C, is defined so as to fall within the range of 10 at % to 17 at %. This is because if the mole fractions x and y fell out of these ranges, a crystalline phase with a Curie temperature of 610° C. to 700° C. to be described later could not crystallize.

The metal element M that may be added along with Ti to achieve various effects is arbitrarily selected from the group consisting of Al, Si, V, Cr, Mn, Cu, Zn, Ga, Zr, Nb, Mo, Ag, Hf, Ta, W, Pt, Au and Pb.

If the mole fraction z of the metal element M that always includes Ti were less than 0.5 at %, then the above effects would not be achieved fully even though Ti is added. That is why the mole fraction z needs to be at least 0.5 at %. However, if this metal element M were added too much, then an oxide film would be formed while a melt of the material alloy is prepared, thus making it difficult to melt the alloy just as intended. In addition, the magnetization of the $R_2Fe_{14}B$-type compound phase (i.e., the hard magnetic phase) would decrease. Furthermore, a boride phase with an excessive large grain size would be produced in the resultant nanocomposite magnet to deteriorate the magnetic properties. Considering these potential inconveniences, the mole fraction z is preferably at most 6 at %. Ti preferably accounts for at least 0.25 at % of the overall alloy and at least 50% of the metal element M in the atomicity ratio.

If the atomicity ratio m of Co and/or Ni to substitute for a portion of Fe exceeded 0.5, then the magnetization of the $R_2Fe_{14}B$-type compound phase would decrease. For that reason, m is set so as to satisfy 0≦m≦0.5.

According to the present invention, a molten alloy having the composition described above is rapidly cooled and solidified by a melt-quenching machine, thereby making a rapidly solidified alloy. This rapid cooling process may be carried out using a known melt-quenching machine such as a melt spinning machine or a strip caster. According to the melt spinning method, the melt is quenched by ejecting the molten alloy through a nozzle toward the surface of a chill roller. The chill roller is turning at a predetermined surface velocity Vs within a reduced pressure atmosphere. Thus, the molten alloy that has been ejected toward the surface of the chill roller moves in the direction defined by the surface velocity Vs while having its heat dissipated into the surface of the chill roller and then leaves the surface of the chill roller. After that, the molten alloy is subjected to secondary cooling in the atmosphere and then collected as elongated ribbons. On the other hand, if the melt is quenched by a strip casting process, the molten alloy preferably contacts with the surface of the chill roller by way of a tubular channel.

In the rapid cooling process, the surface of the molten alloy that is about to contact with the chill roller may have a temperature of about 1,250° C. to about 1,650° C., for example. During a very short period of time (of about 0.5 ms to about 1.5 ms) between a point in time the molten alloy at such a high temperature contacts with the surface of the chill roller and a point in time the molten alloy leaves the chill roller, the molten alloy is rapidly cooled and very small crystalline phases and their precursors start to appear in the alloy. According to the present invention, the quenching rate is adjusted within the range of $2.2 \times 10^5$ K/s to $4.5 \times 10^5$ K/s when the surface temperature of the alloy decreases from 900° C. to 700° C. during this rapid cooling process. Particularly when the mole fraction x of R satisfies 8 at %<x<10 at %, the quenching rate is adjusted to the range of $2.2 \times 10^5$ K/s to $2.8 \times 10^5$ K/s. By adjusting the quenching rate within such a narrow range during the rapid cooling process, the fine structure of the rapidly solidified alloy can be optimized.

In a preferred embodiment, the quenching rate is adjusted to $4.0 \times 10^5$ K/s or more when the surface temperature of the alloy decreases from 1,300° C. to 900° C. during the rapid cooling process. Then, the fine structure of the rapidly solidified alloy can be further stabilized and improved.

By performing the rapid cooling process under these conditions, not only the $R_2Fe_{14}B$-type compound phase (hard magnetic phase) but also a totally new, unknown nanocomposite magnet structure, which will eventually include an α-Fe phase and a crystalline phase with a Curie temperature of 610° C. to 700° C. (or 650° C. or less depending on the alloy composition), are formed in the rapidly solidified alloy during the rapid cooling process. The latter crystalline phase will sometimes be referred to herein as an "ω phase". The present inventors presume this ω phase to be an $Fe_2B$-type compound phase (as a stable phase).

It was believed that if a molten alloy having a composition selected from a wide range, including the composition of the present invention, was rapidly cooled by a conventional method, the resultant nanocomposite magnet would include $Nd_2Fe_{23}B_3$ phase, $Fe_{23}B_6$ phase and/or $Fe_3B$ phase as iron-based borides. However, nobody has ever reported that such a nanocomposite magnet included an $Fe_2B$ phase.

The present inventors discovered and confirmed via experiments that a particularly good nanocomposite magnet could be obtained when the rapidly solidified alloy was formed under such conditions as to mainly produce the ω phase, not the iron-based borides (metastable phases), of which the presence had already been pointed out in the art. We made this discovery by analyzing in detail the constituent phases of various types of rapidly solidified alloys, which had been formed with the rapid cooling conditions changed, by thermogravimetry under a magnetic field and by elucidating the correlation between the rapid cooling conditions (including cooling history or cooling procedure) and the rapidly solidified alloy structure.

Hereinafter, the rapidly solidified alloy structure of the present invention, which was analyzed by the thermogravimetry under a magnetic field, will be described. First, the thermogravimetry under a magnetic field will be described with reference to FIGS. 1 and 2.

Figure 1:
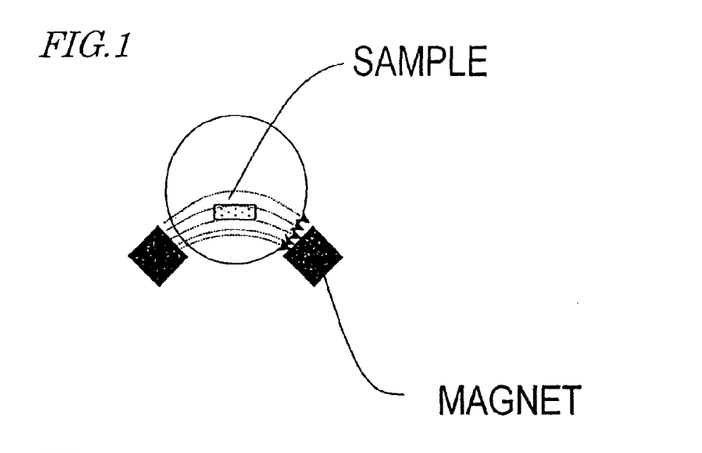
FIG. 1 is a cross-sectional view schematically illustrating how to perform thermogravimetry under a magnetic field.
Figure 2:
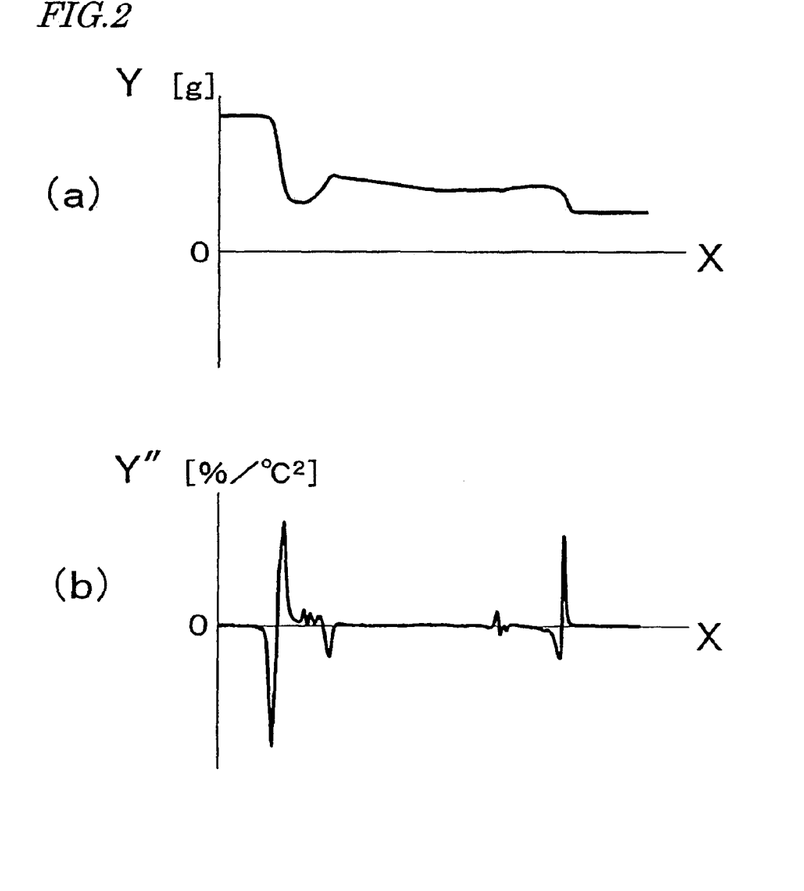
FIG. 2(a) is a graph showing an exemplary result of the thermogravimetry under a magnetic field and FIG. 2(b) is a graph showing the second derivative Y" of the curve shown in FIG. 2(a).

FIG. 1 is a cross-sectional view schematically illustrating how to perform thermogravimetry under a magnetic field. According to the thermogravimetry under a magnetic field, a sample is arranged in a magnetic field produced by a magnet and its weight is measured. If a ferromagnetic body is included in the sample, the sample will be magnetized by the magnetic field and subjected to downward magnetic force. That is why the weight of such a sample measures heavier than its actual weight. If the sample has its weight measured while being heated, then the temperatures, at which the constituent phases of the sample change from the ferromagnetic phase into a paramagnetic phase as the temperature increases (i.e., the Curie temperatures) can be sensed. Consequently, by calculating the variation in the weight of the sample with the variation in temperature, the Curie temperatures of the constituent phases included in the sample can be measured. Stated otherwise, the constituent phases can be identified by these Curie temperature values.

FIG. 2(a) is a graph showing an exemplary result of the thermogravimetry under a magnetic field. In FIG. 2(a), the ordinate represents the weight measured, and the abscissa represents the temperature. FIG. 2(b) shows the second derivative Y" of the curve shown in FIG. 2(a). The Curie temperature corresponds to a point at which Y"=0 while Y" changes from negative into positive with the increase in temperature X. To eliminate measuring errors, however, changes of the curve Y" are analyzed only when the local minimum value becomes −0.001 [%/° C.$^2$] or less in the vicinity of the point where Y"=0.

When the rapidly solidified alloy of the present invention was subjected to the thermogravimetry under the magnetic field, the Curie temperatures were spotted at about 310° C., about 630° C., and about 740° C. The phase identified by the Curie temperature of about 310° C. is the $Nd_2Fe_{14}B$ phase. The phase identified by the Curie temperature of about 740° C. is the α-Fe phase. And the phase (ω phase) identified by the Curie temperature of about 630° C. (in the range of 610° C. to 650° C.) would be the $Fe_2B$ phase as described above. The $Fe_2B$ itself has a Curie temperature of about 740° C. In the present invention, however, the Curie temperature that is lower than it by about 100° C. is observed because Fe is partially replaced with Ti.

Figure 3:
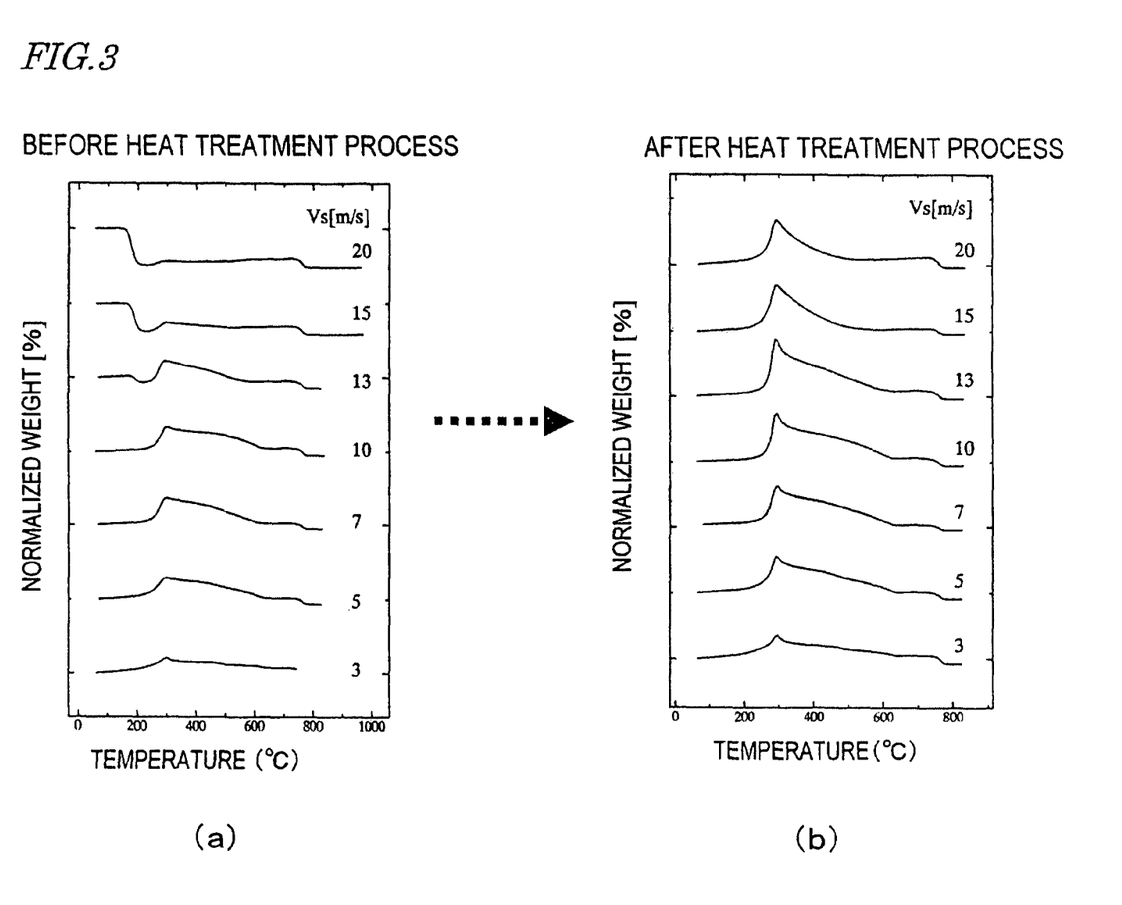
FIG. 3(a) is a graph showing weight variation curves of various rapidly solidified alloys under a magnetic field, which had been formed with the surface velocity Vs of the chill roller changed within the range of 3 m/s to 20 m/s.
FIG. 3(b) is a graph showing weight variation curves of nanocomposite magnets under a magnetic field, which were obtained by thermally treating those rapidly solidified alloys.

FIG. 3(a) shows weight variation curves of various rapidly solidified alloys under a magnetic field, which had been formed with the surface velocity Vs of the chill roller changed within the range of 3 m/s to 20 m/s. FIG. 3(b) shows weight variation curves of nanocomposite magnets under a magnetic field, which were obtained by thermally treating and crystallizing those rapidly solidified alloys at 700° C. for 5 minutes. In FIG. 3, the ordinate represents the normalized sample weight and the abscissa represents the sample temperature. In FIGS. 3(a) and 3(b), the respective left ends of the curves should be drawn at the same level but are intentionally shifted vertically because it would be difficult to identify those curves from each other when overlapped together. The same statement will apply to FIGS. 4, 5, 11 and 13 to be referred to later.

As can be seen from FIG. 3, if the roller surface velocity Vs was relatively low, the in-field weight variation curves hardly changed before and after the heat treatment process was carried out for crystallization purposes. This means that the fine structures of the rapidly solidified alloys, which had been formed at a relatively low roller surface velocity Vs, did not change significantly even after having gone through the heat treatment process for crystallization. That is to say, when the roller surface velocity Vs was low, the crystallization advanced during the rapid cooling process. Thus, it can be seen that crystalline phases were already present at a sufficiently high percentage in the rapidly solidified alloys even before the alloys were thermally treated and crystallized.

On the other hand, if the roller surface velocity Vs was relatively high, the in-field weight variation curves changed significantly before and after the heat treatment process. This means that if the roller surface velocity Vs was high, rapidly solidified alloys including a lot of amorphous phases were obtained and crystallized as a result of the heat treatment process for crystallization.

Figure 4:
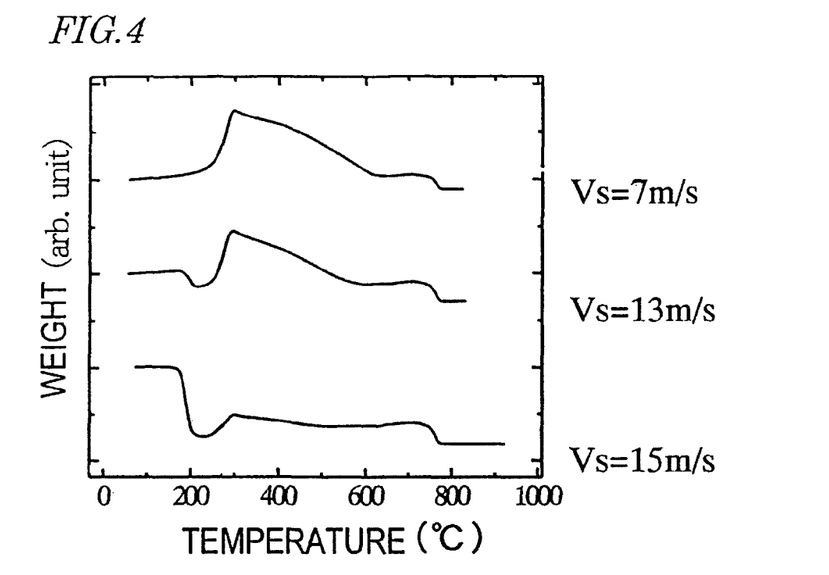
FIG. 4 is a graph showing the weight variation curves of the rapidly solidified alloys obtained at surface velocities Vs of 7 m/s, 13 m/s and 15 m/s.

FIG. 4 shows, on a larger scale, the weight variation curves of the rapidly solidified alloys that were obtained at surface velocities Vs of 7 m/s, 13 m/s and 15 m/s. As can be seen from FIG. 4, just by changing the roller surface velocities Vs from 13 m/s to 15 m/s, the profiles representing the thermogravimetric variations in the magnetic field changed significantly.

Figure 5:
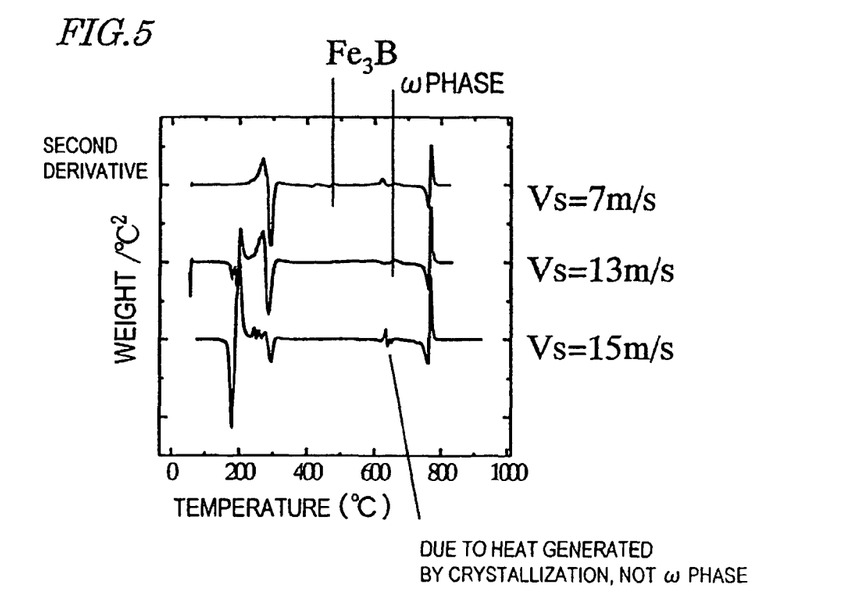
FIG. 5 is a graph showing the second derivatives of the respective weight variation curves shown in FIG. 2.

FIG. 5 shows the second derivatives of the respective weight variation curves. As for a sample that was made at a surface velocity Vs of 13 m/s (representing specific example of the present invention), a phase having a Curie temperature within the range of 610° C. to 650° C. (i.e., the w phase) was identified. On the other hand, as for a sample that was made at a surface velocity Vs of 15 m/s (representing a comparative example), no ω phase was identified but some variations due to the heat generated by $Nd_2Fe_{14}B$ crystallizing were observed. And as for a sample that was made at a surface velocity Vs of 7 m/s (representing another comparative example), both the ω phase and $Fe_3B$ were identified. As can be seen, only when the quenching rate falls within a particular range during the rapid cooling process, more ω phase than $Fe_3B$ can be produced.

As described above, a rapidly solidified alloy for a nanocomposite magnet according to the present invention is characterized by including not only the hard magnetic $Nd_2Fe_{14}B$ phase but also the soft magnetic ω phase already, although it is still a rapidly solidified alloy. Besides the ω phase, α-Fe phase and other iron-based borides such as $Nd_2Fe_{23}B$ phase, $Fe_{23}B_6$ phase and/or $Fe_3B$ phase may be included as soft magnetic phases. In any case, however, the ω phase needs to be the majority of the iron-based borides.

By detecting the Curie temperatures of the constituent phases of the rapidly solidified alloy by the thermogravimetry under a magnetic field described above, it is possible to determine whether or not the rapidly solidified alloys have followed a proper cooling procedure and to predict the properties of the resultant nanocomposite magnets. That is why to mass-produce nanocomposite magnets, just by sampling some of the rapidly solidified alloys obtained and subjecting them to the thermogravimetry under a magnetic field, only rapidly solidified alloys that have followed the proper cooling procedure can be advanced to the next processing step. On the other hand, the remaining rapidly solidified alloys that are regarded as not having followed the proper cooling procedure just need to be melted and rapidly cooled again.

This decision on the proper cooling procedure can be made by determining whether or not the given rapidly solidified alloy includes a crystalline phase (i.e., ω phase) having a Curie temperature of 610° C. to 700° C. (which may be 650° C. or less depending on the alloy composition) and almost no $Fe_3B$ phase.

[Melt-Quenching Machine]

Next, a schematic configuration for a melt spinning machine will be described with reference to FIGS. 6(a) and 6(b) as an exemplary melt-quenching machine according to the present invention.

Figure 6:
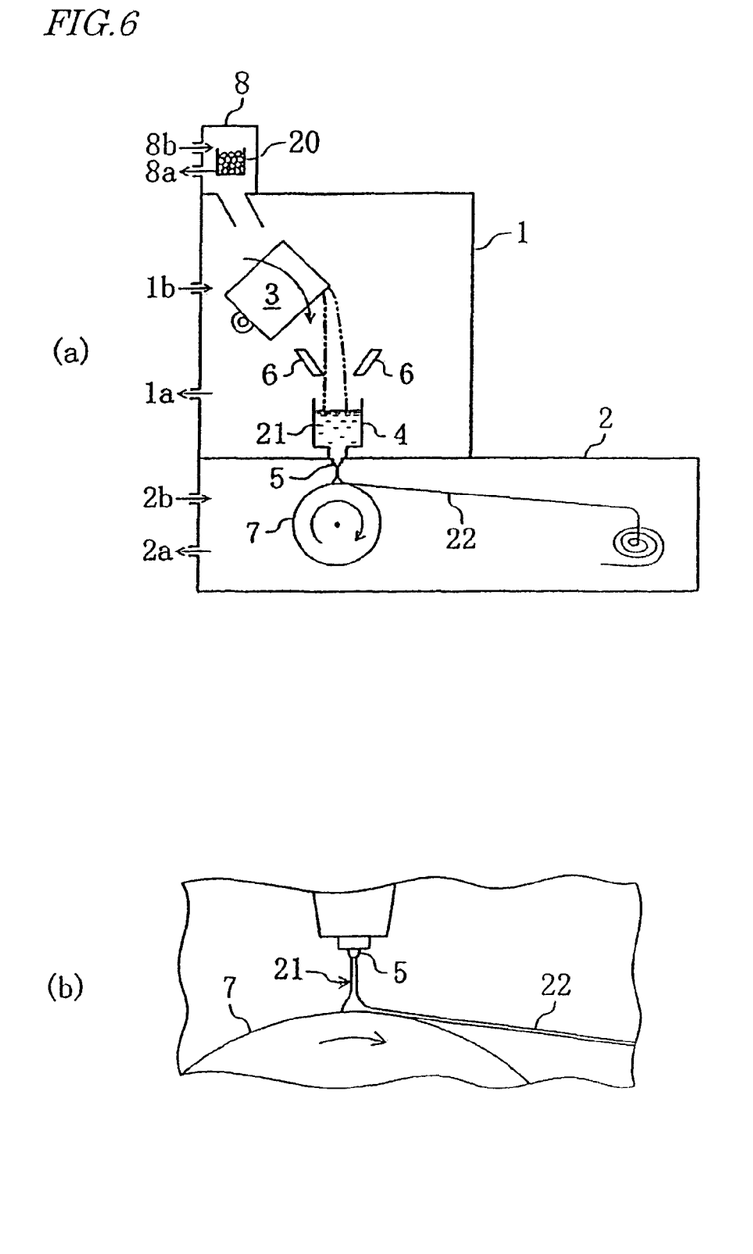
FIG. 6(a) illustrates an overall arrangement of a melt spinning machine for use in the present invention.
FIG. 6(b) illustrates, on a larger scale, a portion of the machine where the alloy is rapidly cooled and solidified.

The machine shown in FIG. 6 includes material alloy melting and quenching chambers 1 and 2, in which a vacuum or an inert atmosphere is maintained at an adjustable pressure. Specifically, FIG. 6(a) illustrates an overall arrangement of the machine, while FIG. 6(b) illustrates a portion of the machine on a larger scale.

As shown in FIG. 6(a), the melting chamber 1 includes: a melt crucible 3 to melt, at an elevated temperature, a material 20 that has been mixed to have a desired magnet alloy composition; a reservoir 4 with a teeming nozzle 5 at the bottom; and a mixed material feeder 8 to supply the mixed material into the melt crucible 3 while maintaining an airtight condition. The reservoir 4 stores the melt 21 of the material alloy therein and is provided with a heater (not shown) to maintain the temperature of the melt teemed therefrom at a predetermined level. The quenching chamber 2 includes a rotating chill roller 7 for quenching and solidifying the melt 21 that has been dripped through the teeming nozzle 5.

In this machine, the atmosphere and pressure inside the melting and quenching chambers 1 and 2 are controllable within prescribed ranges. For that purpose, atmospheric gas inlet ports 1b, 2b and 8b and outlet ports 1a, 2a and 8a are arranged at appropriate positions of the machine. In particular, the gas outlet port 2a is connected to a pump to control the absolute pressure inside the quenching chamber 2 within a range of 13 kPa to the normal pressure (i.e., atmospheric pressure).

The melt crucible 3 may define a desired tilt angle to pour the melt 21 through a funnel 6 into the reservoir 4. The melt 21 is heated in the reservoir 4 by the heater (not shown).

The teeming nozzle 5 of the reservoir 4 is positioned on the boundary wall between the melting and quenching chambers 1 and 2 to drip the melt 21 in the reservoir 4 onto the surface of the chill roller 7, which is located under the nozzle 5. The orifice diameter of the teeming nozzle 5 may be 0.5 mm to 2.0 mm, for example. If the viscosity of the melt 21 is high, then the melt 21 cannot flow through the teeming nozzle 5 easily. In this embodiment, however, the pressure inside the quenching chamber 2 is kept lower than the pressure inside the melting chamber 1. As a result, an appropriate pressure difference is created between the melting and quenching chambers 1 and 2, and the melt 21 can be teemed smoothly.

The chill roller 7 is preferably made of Cu, Fe or an alloy including Cu or Fe. If the chill roller were made of a material other than Cu or Fe, the resultant rapidly solidified alloy could not come off the chill roller easily and might be wound around the roller. The chill roller 7 may have a diameter of 300 mm to 500 mm, for instance. The water-cooling capability of a water cooler provided inside the chill roller 7 is calculated and adjusted based on the latent heat of solidification and the volume of the melt teemed per unit time.

EXAMPLES

Hereinafter, specific examples of the present invention and comparative examples will be described.

Example 1

In a first specific example of the present invention, a molten alloy having a composition $Nd_7Pr_1Fe_{bal}B_{12}Ti_4$ was quenched using the melt-quenching machine shown in FIG. 6, thereby making a rapidly solidified alloy in the shape of a ribbon with a thickness of 50 μm to 130 μm. The melt was teemed at a pressure of 30 kPa and at a temperature (melt surface temperature) of 1,400° C. The temperature of the molten alloy was measured on an infrared thermal imagery.

The rapid cooling conditions were controlled by adjusting the pressure of the argon (Ar) atmosphere within the quenching chamber and the surface velocity Vs of the rotating chill roller. More specifically, the surface velocity Vs of the chill roller was varied within the range of 5 m/s to 20 m/s in the atmosphere having pressures of 1.3 kPa, 33 kPa and 62 kPa.

Figure 7:
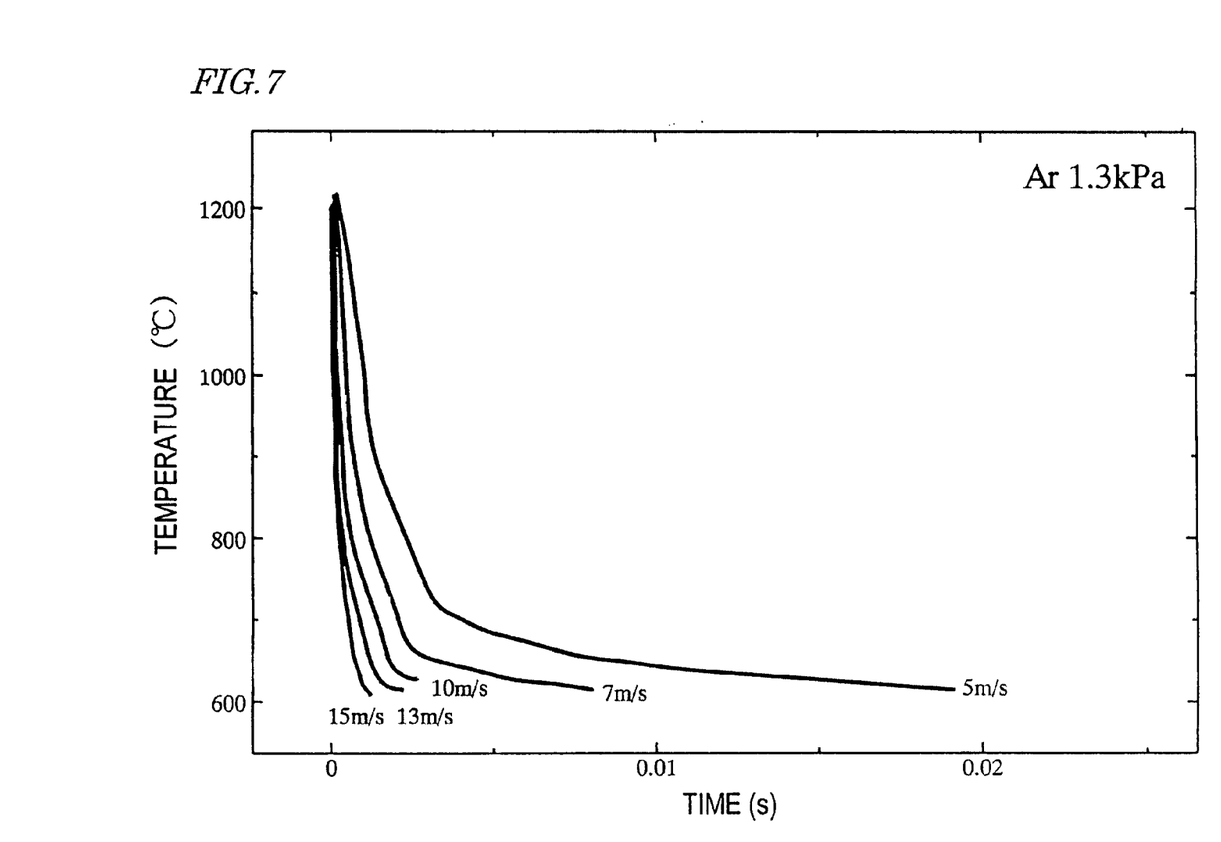
FIG. 7 is a graph showing rapid cooling procedures in situations where the roller surface velocities Vs are changed from 5 m/s to 7 m/s, 10 m/s, 13 m/s and 15 m/s with, the pressure of the atmosphere fixed at 1.3 kPa.

FIG. 7 is a graph showing rapid cooling procedures in situations where the roller surface velocities Vs are changed from 5 m/s to 7 m/s, 10 m/s, 13 m/s and 15 m/s with the pressure of the Ar atmosphere fixed at 1.3 kPa. In this graph, the ordinate represents the alloy surface temperature as measured on an infrared thermal imagery and the abscissa represents the amount of time passed since the melt was teemed. The molten alloy and the chill roller keep contact with each other for just 0.001 s after the melt has been teemed. During that short contact period, the alloy surface temperature plummeted to 700° C. or less.

Figure 8:
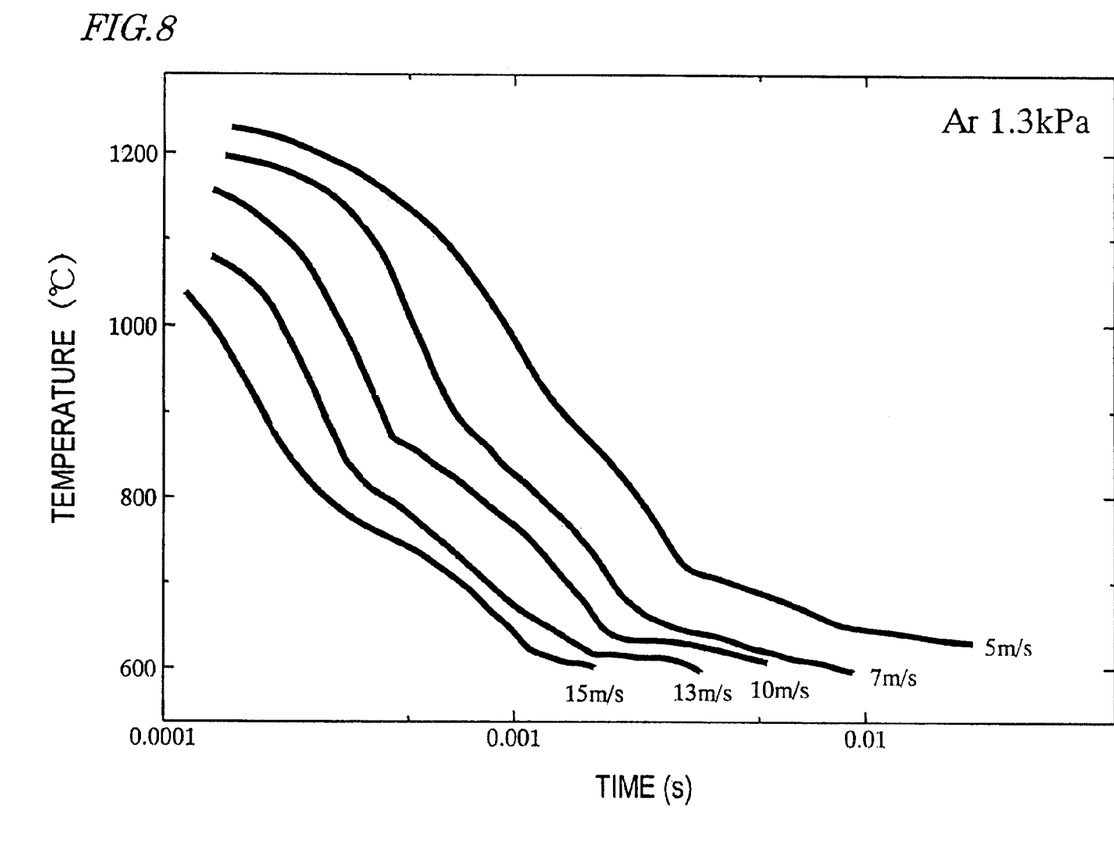
FIG. 8 is a graph showing, in further detail, the rapid cooling procedures in the range where the alloy surface temperature drops steeply.

FIG. 8 is a graph showing, in further detail, the rapid cooling procedures in the range where the alloy surface temperature drops steeply. The only difference between this graph and that shown in FIG. 7 is the scale on the axis of abscissas representing the time. As can be seen clearly from FIG. 7, the quenching rate while the alloy surface temperature drops from 900° C. to 700° C. (i.e., the absolute value of the gradient of the curve) depends on the roller surface velocity Vs.

Figure 9:
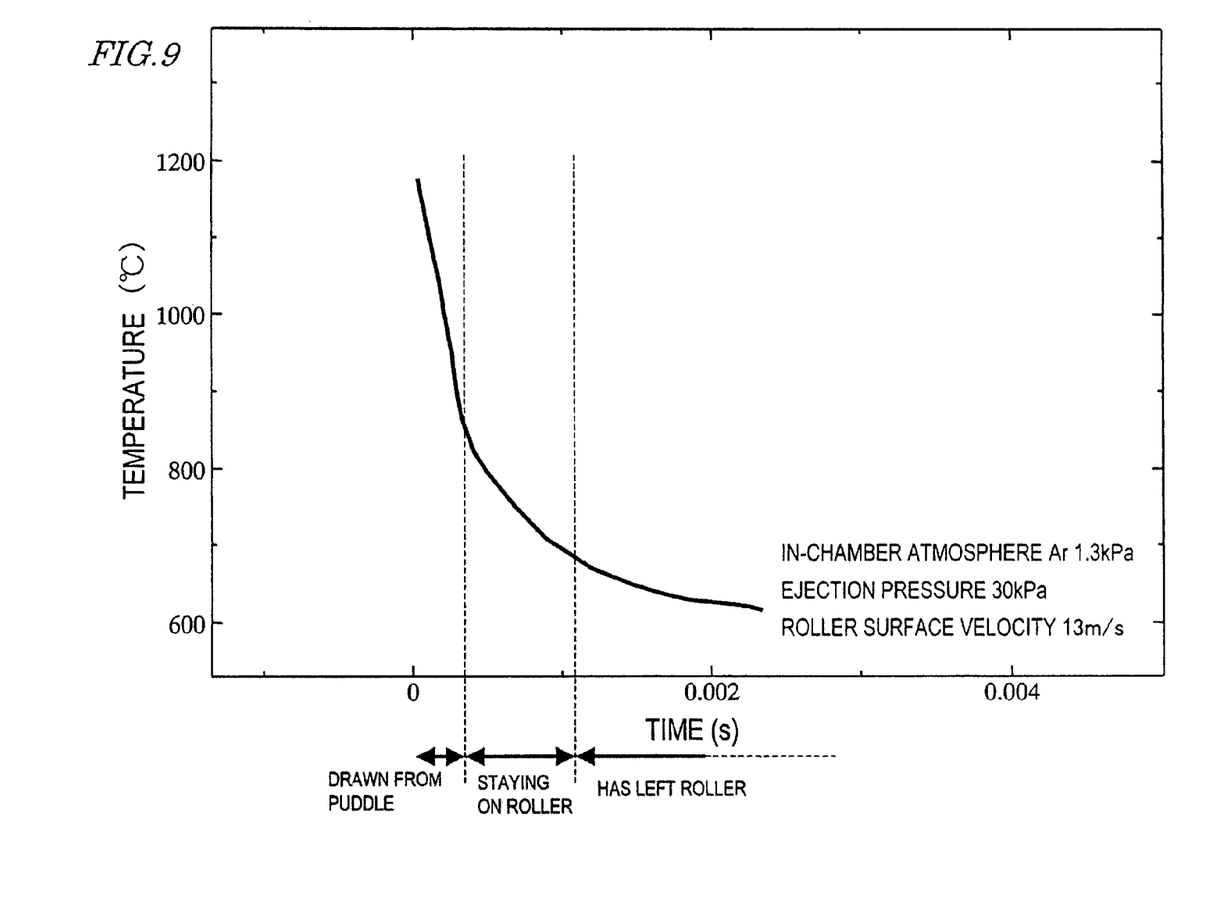
FIG. 9 is a graph showing the cooling procedure in a situation where the molten alloy is quenched within an Ar atmosphere having a pressure of 1.3 kPa at a surface velocity Vs of 13 m/s.

FIG. 9 shows the cooling procedure in a situation where the molten alloy is quenched within an Ar atmosphere having a pressure of 1.3 kPa at a surface velocity Vs of 13 m/s. When the molten alloy is ejected onto the chill roller, a puddle is formed on the rotating chill roller. The molten alloy is drawn from the puddle, moves along with the roller, and soon leaves the surface of the roller. In FIG. 9, the respective stages of the rapid cooling process are associated with the cooling procedure. Specifically, the period in which the molten alloy temperature drops from 1,300° C. to 900° C. substantially corresponds to the period in which the molten alloy is drawn from the puddle, while the period in which the molten alloy temperature decreases from 900° C. to 700° C. almost corresponds to the period in which the molten alloy stays on the roller.

Figure 10:
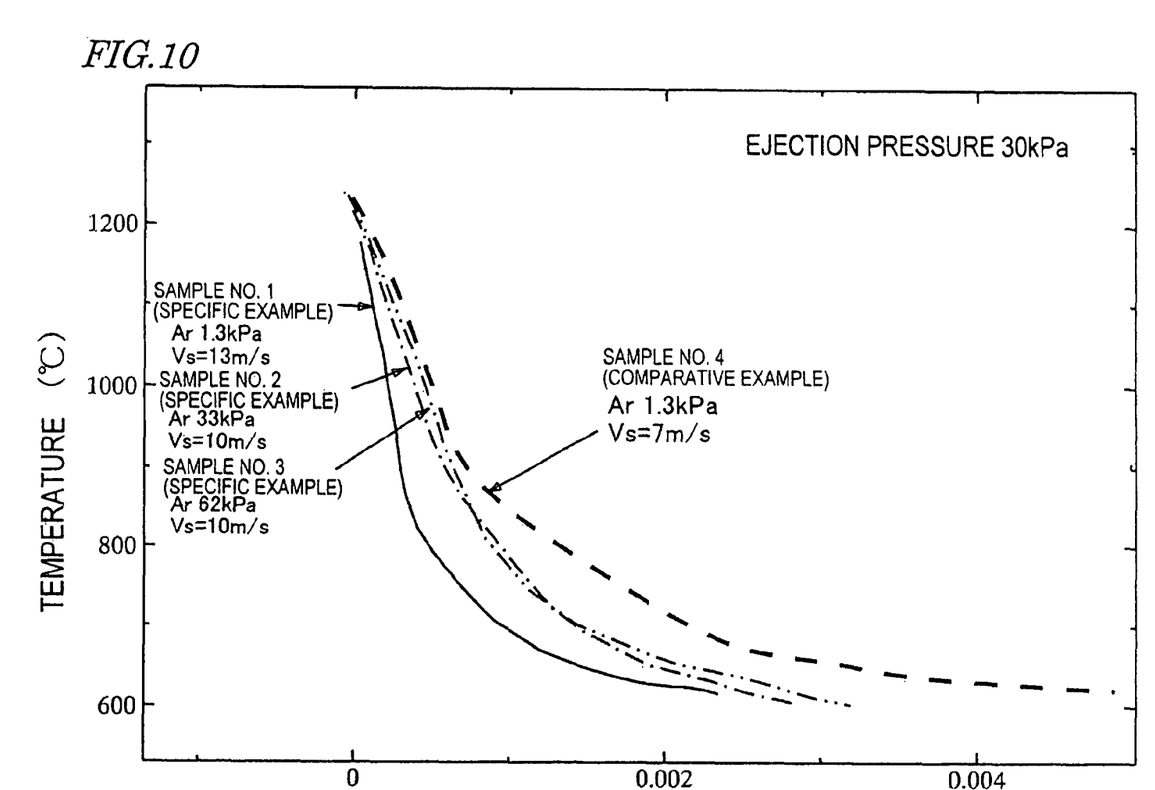
FIG. 10 is a graph showing the rapid cooling procedures of specific examples of the present invention and a comparative example.

FIG. 10 is a graph showing the rapid cooling procedures of specific examples of the present invention and a comparative example.

Samples Nos-1 to 3 represent specific examples of the present invention and had quenching rates of $2.2 \times 10^5$ K/s to $2.8 \times 10^5$ K/s when the alloy surface temperature dropped from 900° C. to 700° C. Specifically, these samples were quenched at:

Sample No. 1: $2.62 \times 10^5$ K/s;
Sample No. 2: $2.42 \times 10^5$ K/s; and
Sample No. 3: $2.44 \times 10^5$ K/s, respectively.

On the other hand, when the alloy surface temperature of Samples Nos. 1 to 3 dropped from 1,300° C. to 900 t, the quenching rates were always higher than $4.0 \times 10^5$ K/s. Specifically, these samples were quenched at:

Sample No. 1: $11.37 \times 10^5$ K/s;
Sample No. 2: $6.01 \times 10^5$ K/s; and
Sample No. 3: $5.86 \times 10^5$ K/s, respectively.

Meanwhile, Sample No. 4 represents a comparative example. Sample No. 4 had a quenching rate of about $1.5 \times 10^5$ K/s when the alloy surface temperature dropped from 900° C. to 700° C. and had a quenching rate of about $4.5 \times 10^5$ K/s when the alloy surface temperature dropped from 1,300° C. to 900° C.

Figure 11:
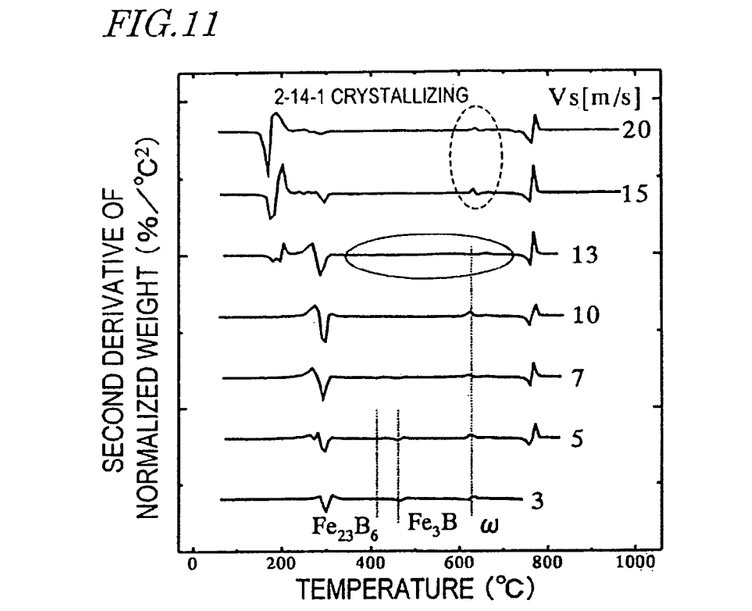
FIG. 11 is a graph showing the second derivatives of thermogravimetric curves for specific examples of the present invention and comparative examples.

Next, the rapidly solidified alloys that had been formed by various rapid cooling processes were subjected to thermogravimetry under a magnetic field. The results are shown in FIG. 11, which shows second derivative curves for rapidly solidified alloys that were quenched within an Ar atmosphere at a pressure of 1.3 kPa and with the roller surface velocities changed within the range of 3 m/s to 20 m/s. In the graph shown in FIG. 11, the curves associated with the roller surface velocities of 10 m/s and 13 m/s represent specific examples of the present invention, while the curves associated with the roller surface velocities of 3 m/s, 5 m/s, 7 m/s, 15 m/s and 20 m/s represent comparative examples. As can be seen from FIG. 11, if the roller surface velocity is low, not only the ω phase but also $Fe_3B$ and $Fe_{23}B_6$ are produced. At roller surface velocities of 15 m/s and 20 m/s, when the sample temperature exceeded 600° C. during the thermogravimetry, an $R_2Fe_{14}B$ phase was produced, which caused a thermogravimetric variation under a magnetic field. As a result, the second derivative curve also had a small peak, which does not corresponds to a Curie temperature, though. Therefore, if the roller surface velocity were too high, no ω phase would be identified.

Figure 12:
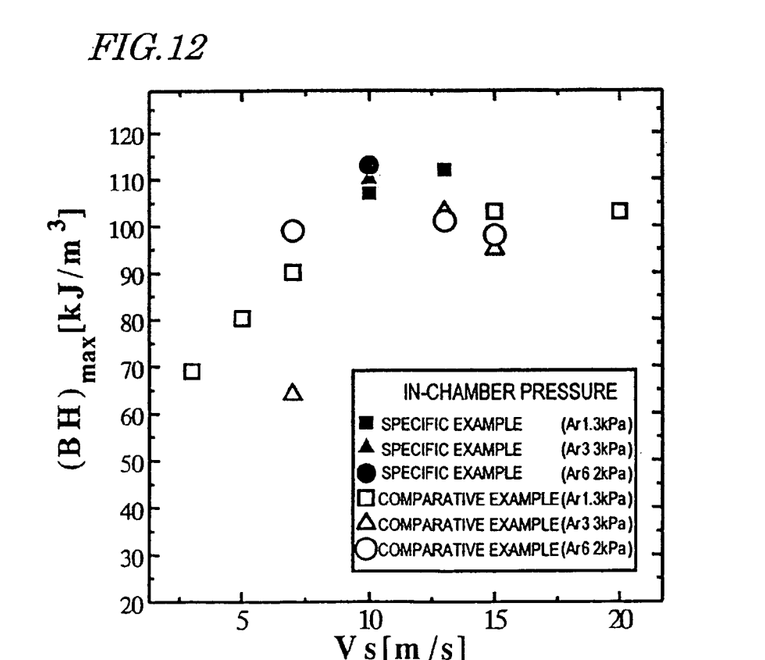
FIG. 12 is a graph showing the maximum energy products $(BH)_{max}$ of specific examples of the present invention and comparative examples.

Next, the rapidly solidified alloys were thermally treated and then the magnet performances of the resultant nanocomposite magnets were evaluated. The results are shown in FIG. 12. As can be seen from the graph shown in FIG. 12, the maximum energy products $(BH)_{max}$ of specific examples of the present invention were higher than those of comparative examples.

As also shown in FIG. 12, the lower the roller surface velocity, the lower the maximum energy product $(BH)_{max}$. Thus, it can be seen that the magnet performance declines if not only the ω phase but also $Fe_3B$ and $Fe_{23}B_6$ are produced.

Example 2

In a second specific example of the present invention, a molten alloy having a composition $Nd_{8.2}Fe_{bal}Co_6B_{11}C_1Ti_5$ was quenched, thereby making a rapidly solidified alloy in the shape of a ribbon with a thickness of 50 μm to 130 μm. The rapid cooling conditions and resultant magnet performance are shown in the following Table 1. The conditions not shown in Table 1 are the same as those set for the first specific example described above:

TABLE 1

| Roller surface velocity $V_S$ [m/s] | Chamber pressure [kPa] | Quenching rate (1400-900° C.) [$10^5$ K/s] | Quenching rate (900-700° C.) [$10^5$ K/s] | $(BH)_{max}$ [kJ/m²] |
|---|---|---|---|---|
| 10 | 30 | 6.00 | 2.42 | 120 |
| 15 | 30 | 15.8 | 3.12 | 125 |
| 17 | 30 | 19.1 | 3.52 | 120 |

Figure 13:
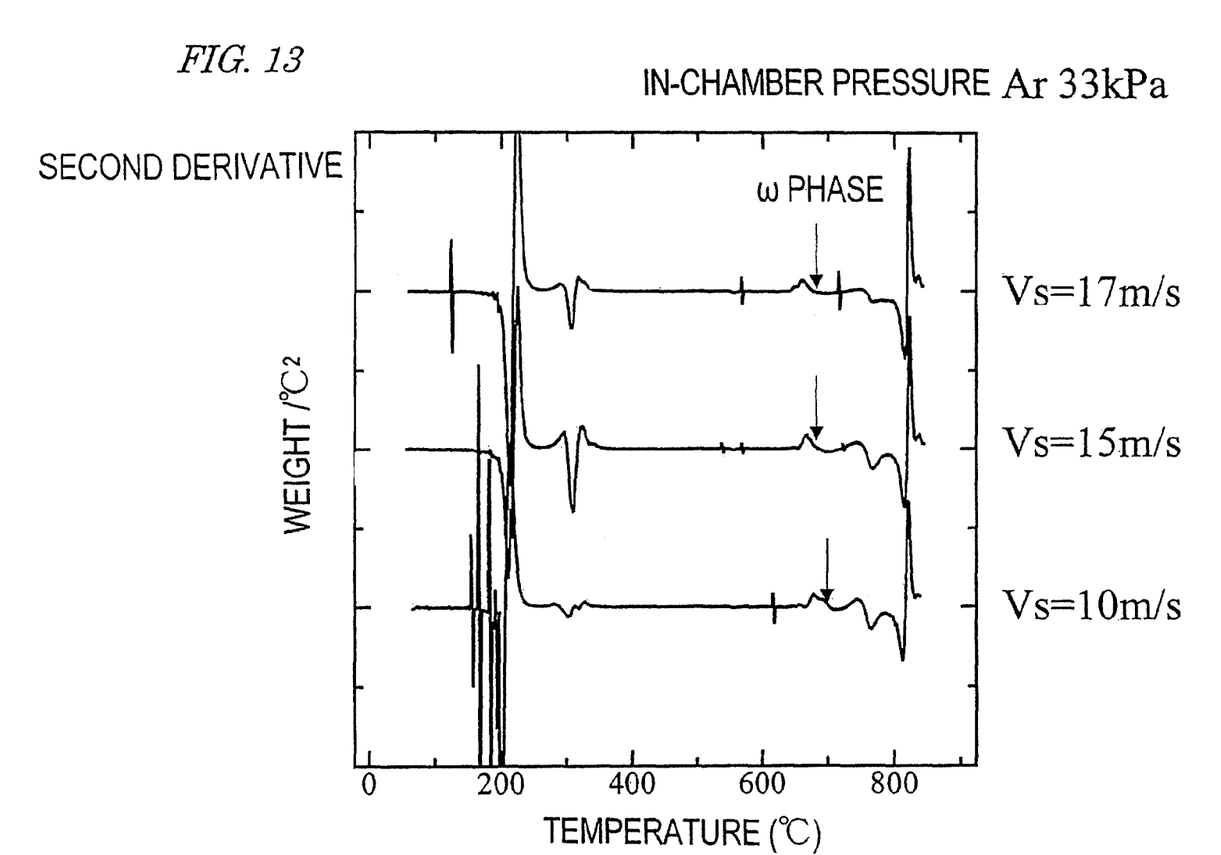
FIG. 13 is a graph showing the second derivatives of the thermogravimetric curves of another specific example of the present invention.

FIG. 13 is a graph showing the second derivatives of the thermogravimetric curves of this specific example.

The ω phase produced in the rapidly solidified alloy of this specific example had a Curie temperature of 650° C. to 700° C. This Curie temperature is higher than that of the ω phase of the first specific example due to the difference in alloy composition. One of the reasons why the Curie temperature of the ω phase of this specific example falls within the range of 650° C. to 700° C. would be the addition of Co.

As can be seen, the Curie temperature of the ω phase is changeable within the range of 610° C. to 700° C. according to the alloy composition. Nevertheless, when made under such rapid cooling conditions as to produce the (0 phase, every magnet showed excellent properties.

INDUSTRIAL APPLICABILITY

A nanocomposite magnet and a method for producing the magnet according to the present invention can be used effectively in a bonded magnet, for example. Also, a decision method according to the present invention makes it possible to predict the performance of the resultant nanocomposite magnet when the magnet is still a rapidly solidified alloy, thus contributing to increasing the production yield significantly at factories.

What is claimed is:

1. A nanocomposite magnet having a composition represented by the general formula: $R_xQ_yM_z(Fe_{1-m}T_m)_{bal}$, where R is at least one rare-earth element, Q is at least one element selected from the group consisting of B and C, M is at least one metal element that is selected from the group consisting of Al, Si, Ti, V, Cr, Mn, Cu, Zn, Ga, Zr, Nb, Mo, Ag, Hf, Ta, W, Pt, Au and Pb and that always includes Ti, T is at least one element selected from the group consisting of Co and Ni, and the mole fractions x, y, z and m satisfy the inequalities of 6 at %≦x<10 at %,
10 at %≦y≦17 at %,
0.5 at %≦z≦6 at % and
0≦m≦0.5, respectively, the nanocomposite magnet including a hard magnetic phase and a soft magnetic phase that are magnetically coupled together, wherein the hard magnetic phase is made of an $R_2Fe_{14}B$-type compound, and wherein the soft magnetic phase includes an α-Fe phase and an $Fe_2B$ phase as its main phases.

2. The nanocomposite magnet of claim 1, wherein 6 at %≦x≦8 at %.

3. A rapidly solidified alloy to make a nanocomposite magnet, the alloy having a composition represented by the general formula: $R_xQ_yM_z(Fe_{1-m}T_m)_{bal}$, where R is at least one rare-earth element, Q is at least one element selected from the group consisting of B and C, M is at least one metal element that is selected from the group consisting of Al, Si, Ti, V, Cr, Mn, Cu, Zn, Ga, Zr, Nb, Mo, Ag, Hf, Ta, W, Pt, Au and Pb and that always includes Ti, T is at T is at least one element selected from the group consisting of Co and Ni, and the mole fractions x, y, z and m satisfy the inequalities of 6 at %≦x<10 at %,
10 at %≦y≦17 at %,
0.5 at %≦z≦6 at % and
0≦m≦0.5, respectively, wherein the rapidly solidified alloy includes an $R_2Fe_{14}B$-type compound, an α-Fe phase and an $Fe_2B$ phase.

4. The rapidly solidified alloy of claim 3, wherein 6 at %≦x≦8 at %.

* * * * *